(12) United States Patent
Marcus

(10) Patent No.: US 8,295,710 B2
(45) Date of Patent: Oct. 23, 2012

(54) OPTICAL I-Q-MODULATOR

(75) Inventor: Winter Marcus, Waldbronn (DE)

(73) Assignee: Nokia Siemens Networks Oy, Espoo (FI)

( * ) Notice: Subject to any disclaimer, the term of this patent is extended or adjusted under 35 U.S.C. 154(b) by 41 days.

(21) Appl. No.: 13/002,551

(22) PCT Filed: Jul. 6, 2009

(86) PCT No.: PCT/EP2009/058472
§ 371 (c)(1),
(2), (4) Date: Mar. 10, 2011

(87) PCT Pub. No.: WO2010/000863
PCT Pub. Date: Jan. 7, 2010

(65) Prior Publication Data
US 2011/0164305 A1    Jul. 7, 2011

(30) Foreign Application Priority Data

Jul. 4, 2008  (EP) .................................... 08104643

(51) Int. Cl.
*H04B 10/12* (2006.01)
*G02F 1/03* (2006.01)
(52) U.S. Cl. ........ 398/183; 398/130; 398/788; 398/200; 359/245; 359/263; 359/315; 359/318; 359/298; 359/301; 359/302; 359/303; 385/1; 385/3
(58) Field of Classification Search .................. 398/130, 398/183, 188, 200; 385/1, 3; 359/245, 263, 359/315, 318, 298, 301–303
See application file for complete search history.

(56) References Cited

U.S. PATENT DOCUMENTS

| 5,109,441 | A | 4/1992 | Glaab |
| 5,483,369 | A * | 1/1996 | Darcie et al. .................... 398/71 |
| 6,204,951 | B1 | 3/2001 | Coward et al. |
| 7,636,501 | B2 * | 12/2009 | Doerr et al. ........................ 385/3 |
| 2004/0170351 | A1* | 9/2004 | Fishman et al. .................. 385/3 |
| 2006/0034616 | A1 | 2/2006 | Tipper |
| 2006/0210283 | A1 | 9/2006 | Shirasaki |

FOREIGN PATENT DOCUMENTS

WO        9853367 A1    11/1998

OTHER PUBLICATIONS

Hitoshi et al: "EA-Modulator-Based Optical Time Division", IEEE Journal of Selected Topics in Quantam Electronics, XP011163499, Jan. 1, 2007, pp. 70-78, vol. 13, No. 1, Piscataway, New Jersey, USA.

* cited by examiner

*Primary Examiner* — Evelyn A. Lester
(74) *Attorney, Agent, or Firm* — Laurence A. Greenberg; Werner H. Stemer; Ralph E. Locher

(57) ABSTRACT

The invention describes a modulator for the quadrature modulation of an optical carrier signal with an I- and a Q-portion, where a first optical multimode interferometer (MMI) splits the optical carrier signal into four branches and that in pairs of branches the I-portion and the Q-portion respectively is modulated with a Mach-Zehnder-Structure and a second optical multimode interferometer (MMI) combines the modulated I-portion and Q-portion again to one quadrature modulated optical output signal (OS).

10 Claims, 1 Drawing Sheet

OPTICAL I-Q-MODULATOR

BACKGROUND OF THE INVENTION

Field of the Invention

The invention relates to a modulator for the quadrature modulation of an optical carrier signal with an I- and a Q-portion.

An optical I-Q-modulator is used in optical networks to transmit the data on the optical carrier signal in multilevel formats to achieve a high transmission data rate. The Q-portion of the carrier signal is shifted in relation to the I-portion by a fourth of the wavelength.

The current method to implement an I-Q-modulator is to use separate Mach-Zehnder-interferometers for the I-portion and the Q-portion of the carrier signal. To split the signal, the Mach-Zehnder-interferometers are arranged in a Mach-Zehnder-Super-Structure. This involves a considerable number of components which are quite large in size and difficult to integrate.

In the patent U.S. Pat. No. 7,063,601 an optical modulator is proposed in which a complex driver circuitry is used to build the driving signals for one Mach-Zehnder-modulator. This also leads to a complex structure.

BRIEF SUMMARY OF THE INVENTION

It is the object of the invention to propose an I-Q-modulator, which is easy to integrate and in this way to build one compact optical component.

This objective is achieved with the claimed features.

Favourable embodiments of the invention are disclosed in the dependent claims.

A basic building element for such a modulator is a 4-port multimode interferometer, acting as a 1:4 power splitter, which splits the optical carrier signal into four branches. It is an optical integrated circuit with a low loss and good power balance at each branch, compactness and ease of fabrication.

So the optical carrier signal is split into four branches, which carry intermediate signals of equal power.

The four branches are grouped into two pairs and some branches contain fixed phase shifts in order to obtain pairwise Mach-Zehnder-structures with a mutual phase shift of a quarter wavelength. In each pair of the intermediate signals the according portion of the carrier signal is modulated with a driving signal. To avoid frequency chirp, the modulation in each branch of the pair is in opposite polarity, in the so-called push-pull configuration. So the I-portion and the Q-portion of the carrier signal are modulated separately.

The modulated signals are combined again in a second multimode interferometer into one quadrature-modulated optical output signal.

This combination of multimode-interferometers, phase modulators and phase shifters can be integrated to a compact integrated optical circuit.

In one embodiment the modulation is done with phase shifters using the electro-optical effect, where an applied driving voltage shifts the phase of the optical signal.

In a further embodiment the modulation is done with amplitude modulators using the electro-absorption effect, where an applied driving voltage attenuates the amplitude of the optical signal. In this case, the integrated fixed phase shifts are such that each branch corresponds to one axis (+I, −I, +Q, −Q) of the I-Q constellation diagram.

It is also possible to use waveguides as phase shifters which can be modulated.

When building the optical circuit, the branches of the multimode interferometer can be formed as waveguides and the connecting branches of the first and the second multimode interferometer are used as straight waveguides, which can be modulated.

In the figures some aspects of the modulator are shown.

DESCRIPTION OF THE INVENTION

Figure 1:
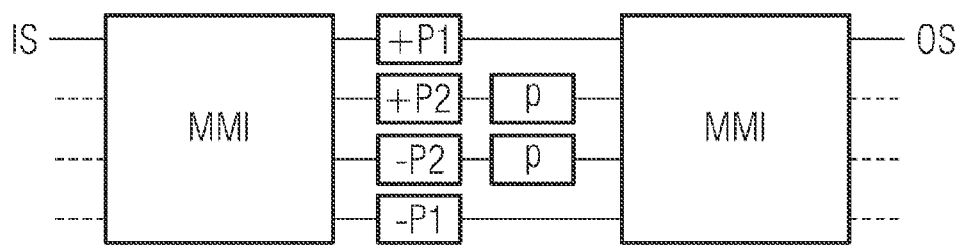
FIG. 1 shows an embodiment with two pairs of branches, where one pair is phase shifted.

FIG. 1 shows a modulator, in which two multimode interferometers MMI are linked together. The input signal IS is splitted in the first MMI into four branches, which have a defined phase shift to the input signal. The branches are grouped into pairs, which are modulated with opposite driving signals. The inphase portion I is modulated with the phase modulators +P1 and −P1, while the quadrature portion Q is modulated with the phase modulators +P2 and −P2. The fixed phase shifters P=π compensate for the fixed phase shift of the branches.

The dashed lines on the input and output of the MMIs indicate, that also 4×4 MMIs can be used. In this case on the first MMI only one input is used and on the second MMI only one output. Another option is to use 1:4 power splitters, in which the input/output waveguide is located in the center of the structure. This can be incorporated by adjusting the fixed phase shifts P accordingly.

Figure 2:
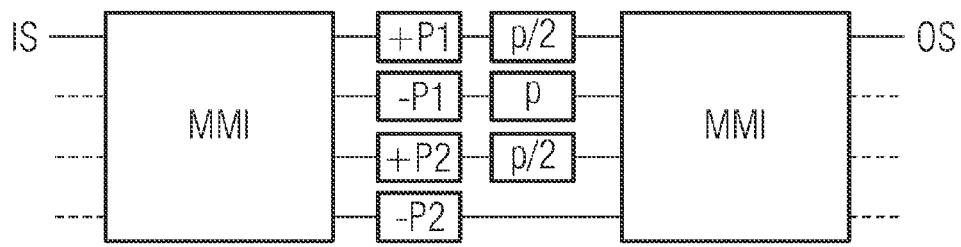
FIG. 2 shows another arrangement with three phase shifters.

In FIG. 2 another arrangement of the phase modulators between the two MMIs is shown. In the two pairs for the I-Portion P1 and the Q-portion P2 always a phase shift of P/2=π/2 is achieved.

Figure 3:
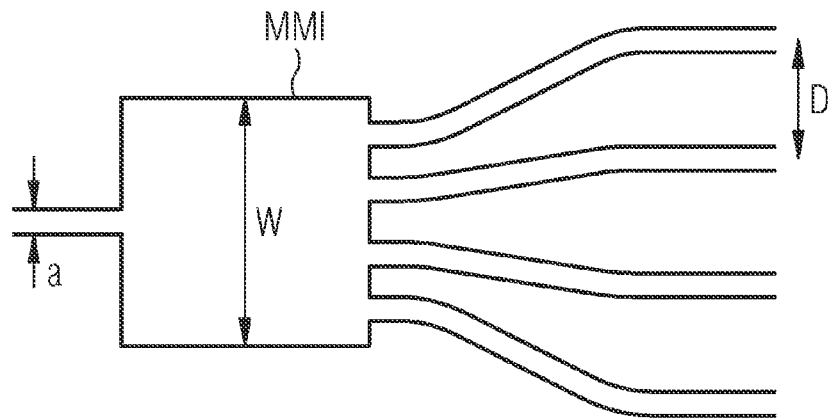
FIG. 3 shows an implementation of an MMI.

FIG. 3 depicts the structure of a MMI that splits the input signal into four outputs. This structure is according to the article titled "Design and Fabrication of 1-by-4 MMI Power Splitter for Optical Communication" of Huilian et. al. published in: Communications, 1999. APCC/OECC '99, pages 1638-1641 vol. 2.

It is an all optical component, where the input signal is fed into the input structure with the width a, then the structure is widened to the width W and fed into the four branches, which bend to a cento-to-center distance D between neighboring branches. In these branches modulating waveguides can be implemented.

The component, described in said article, is designed for the wavelength of the optical signal λ=1.31 µm. The width a is then 2 µm and the width W 40 µm. The distance D is 250 µm. The whole MMI measures 1×2 mm.

This shows that a very compact I-Q-modulator for optical signals can be built, which is all in optical technology.

The invention claimed is:

1. A modulator for quadrature modulation of an optical carrier signal with an I-portion and a Q-portion, the modulator comprising:

a first optical multimode interferometer configured to split the optical carrier signal into four branches carrying intermediate signals, some of the branches containing fixed phase shifters in order to obtain pairwise Mach-Zehnder-structures with a mutual phase shift of a quarter wavelength, and modulators for separately modulating pairs of branches carrying the I-portion and the Q-portion respectively, to form a modulated I-portion and a modulated Q-portion, respectively; and a second optical multimode interferometer configured to combine the modulated I-portion and the modulated Q-portion to one quadrature modulated optical output signal.

2. The modulator according to claim 1, which comprises phase shifters for effecting the modulation.

3. The modulator according to claim 1, wherein the modulation is a phase modulation.

4. The modulator according to claim 3, wherein the phase modulation is achieved by the electro-absorption effect.

5. The modulator according to claim 1, wherein the modulation is an amplitude modulation.

6. The modulator according to claim 5, wherein the amplitude modulation is achieved by the electro-optic effect.

7. The modulator according to claim 1, wherein said first multimode interferometer and said second multimode interferometer are connected by way of branches in the form of waveguides.

8. The modulator according to claim 7, wherein said waveguides are configured as phase shifters.

9. The modulator according to claim 7, wherein said waveguides are capable of being modulated.

10. A method for quadrature-modulating an optical carrier signal with an I-portion and a Q-portion, the method which comprises:

splitting the optical carrier signal with an optical multimode interferometer into four branches carrying intermediate signals;

providing some branches with fixed phase shifters to obtain therefrom pairwise Mach-Zehnder-structures with a mutual phase shift of a quarter wavelength, and modulating pairs of branches carrying the I-portion and the Q-portion respectively separately with modulators; and combining the modulated I-portion and Q-portion with a second optical multimode interferometer to one quadrature modulated optical output signal.

* * * * *